(12) United States Patent
Martire et al.

(10) Patent No.: US 12,353,117 B2
(45) Date of Patent: Jul. 8, 2025

(54) MEDIA PROJECTION WITHIN LIGHT SPHERE DOME

(71) Applicant: Applied Physics, Inc., New York, NY (US)

(72) Inventors: Gianni Martire, New York, NY (US); Jerry Tessendorf, Pendleton, SC (US)

(73) Assignee: Applied Physics, Inc., New York, NY (US)

( * ) Notice: Subject to any disclaimer, the term of this patent is extended or adjusted under 35 U.S.C. 154(b) by 0 days.

(21) Appl. No.: 17/893,865

(22) Filed: Aug. 23, 2022

(65) Prior Publication Data

US 2024/0069424 A1 Feb. 29, 2024

(51) Int. Cl.
*G03B 21/28* (2006.01)
*G02B 13/06* (2006.01)
*G03B 21/54* (2006.01)

(52) U.S. Cl.
CPC ............. *G03B 21/28* (2013.01); *G02B 13/06* (2013.01); *G03B 21/54* (2013.01)

(58) Field of Classification Search
CPC ....... G03B 21/28; G02B 13/06; G02B 17/061
See application file for complete search history.

(56) References Cited

U.S. PATENT DOCUMENTS

| | | | | |
|---|---|---|---|---|
| 2,430,595 A * | 11/1947 | Young | ................. | G02B 17/061 359/731 |
| 3,240,113 A * | 3/1966 | Stechemesser | ........ | G03B 37/00 359/857 |
| 4,012,126 A * | 3/1977 | Rosendahl | ............. | G02B 13/06 359/728 |
| 4,395,093 A * | 7/1983 | Rosendahl | ............. | G02B 13/06 359/725 |
| 5,115,266 A * | 5/1992 | Troje | ..................... | G03B 37/06 396/419 |
| 5,627,675 A * | 5/1997 | Davis | ..................... | G02B 13/06 359/725 |

(Continued)

OTHER PUBLICATIONS

International Search Report and Written Opinion of the International Search Authority in international application No. PCT/US2023/030923, mailed Jan. 3, 2024.

*Primary Examiner* — Bao-Luan Q Le
(74) *Attorney, Agent, or Firm* — Cognition IP, P.C.; Edward Steakley; Justin White

(57) ABSTRACT

A media presentation system can include a media generation component, a projection component, a first redirection component, and a display component. The media generation component can generate video imagery, and the projection component can project one or more beams containing the video imagery in an initial direction. The first redirection component can redirect the beam(s) from the initial direction to a subsequent different direction. The display component can receive the beam(s), display the video imagery, and can form a substantially continuous spherical shape that surrounds multiple human viewers of the video imagery above and around all sides of all viewers. A second redirection component can receive the beam(s) in the subsequent direction from the first redirection component and redirect the beam(s) in a following direction toward the display component. The system can form a dome-shaped movie theater that displays the video imagery at the display component located within the dome.

20 Claims, 8 Drawing Sheets

(56) References Cited

U.S. PATENT DOCUMENTS

| | | | | |
|---|---|---|---|---|
| 5,631,778 A * | 5/1997 | Powell | | G02B 13/06 |
| | | | | 359/725 |
| 5,835,252 A * | 11/1998 | Meier | | G09B 27/02 |
| | | | | 359/201.1 |
| 5,854,713 A * | 12/1998 | Kuroda | | G02B 17/0694 |
| | | | | 250/342 |
| 6,130,783 A * | 10/2000 | Yagi | | G02B 13/06 |
| | | | | 359/627 |
| 6,219,089 B1 * | 4/2001 | Driscoll, Jr. | | H04N 7/18 |
| | | | | 348/39 |
| 6,222,683 B1 * | 4/2001 | Hoogland | | G02B 13/06 |
| | | | | 359/725 |
| 6,313,865 B1 * | 11/2001 | Driscoll, Jr. | | G02B 13/06 |
| | | | | 348/36 |
| 6,327,020 B1 | 12/2001 | Iwata | | |
| 6,331,869 B1 * | 12/2001 | Furlan | | H04N 23/698 |
| | | | | 348/39 |
| 6,333,826 B1 * | 12/2001 | Charles | | G02B 13/06 |
| | | | | 359/728 |
| 6,409,351 B1 * | 6/2002 | Ligon | | G03B 21/00 |
| | | | | 353/98 |
| 6,449,103 B1 * | 9/2002 | Charles | | G02B 17/086 |
| | | | | 359/725 |
| 6,466,254 B1 * | 10/2002 | Furlan | | H04N 21/234345 |
| | | | | 348/39 |
| 6,611,282 B1 * | 8/2003 | Trubko | | G02B 17/0808 |
| | | | | 348/36 |
| 7,019,918 B2 * | 3/2006 | Wallerstein | | G02B 3/04 |
| | | | | 359/728 |
| 7,038,846 B2 * | 5/2006 | Mandella | | G02B 13/06 |
| | | | | 359/708 |
| 7,400,347 B2 * | 7/2008 | Krogmann | | H04N 23/58 |
| | | | | 348/340 |
| 7,570,437 B2 * | 8/2009 | Gal | | G03B 37/06 |
| | | | | 359/708 |
| 7,604,354 B1 * | 10/2009 | Ligon | | G03B 21/28 |
| | | | | 353/30 |
| 7,621,647 B1 * | 11/2009 | Colucci | | G03B 21/147 |
| | | | | 434/293 |
| 7,748,852 B2 * | 7/2010 | Nishigaki | | G03B 37/04 |
| | | | | 353/30 |
| 7,959,307 B1 * | 6/2011 | Colucci | | G03B 21/147 |
| | | | | 434/293 |
| 8,289,630 B2 * | 10/2012 | Togino | | G02B 17/086 |
| | | | | 359/731 |
| 9,395,526 B1 * | 7/2016 | Abdala | | F21V 7/041 |
| 9,575,404 B2 * | 2/2017 | Choi | | E04H 3/30 |
| 9,797,150 B1 * | 10/2017 | Warren | | E04H 3/22 |
| 11,221,468 B2 * | 1/2022 | Antier | | G02B 27/1006 |
| 2005/0259146 A1 * | 11/2005 | Berdugo | | G08B 13/193 |
| | | | | 348/36 |
| 2007/0159607 A1 * | 7/2007 | Nishigaki | | G02B 13/06 |
| | | | | 353/94 |
| 2007/0217042 A1 * | 9/2007 | Kweon | | G02B 17/06 |
| | | | | 359/838 |
| 2008/0186415 A1 | 8/2008 | Boud et al. | | |
| 2010/0108885 A1 * | 5/2010 | Samuelson | | G02B 17/0896 |
| | | | | 250/234 |
| 2010/0110564 A1 * | 5/2010 | Togino | | A61B 1/00177 |
| | | | | 359/725 |
| 2010/0201781 A1 * | 8/2010 | Trubko | | G02B 17/0824 |
| | | | | 348/36 |
| 2010/0300006 A1 * | 12/2010 | Magpuri | | G03B 37/00 |
| | | | | 52/80.1 |
| 2016/0213148 A1 * | 7/2016 | Choi | | G03B 21/604 |
| 2018/0311587 A1 * | 11/2018 | Freedman | | E04B 1/346 |
| 2020/0115914 A1 | 4/2020 | Fox et al. | | |
| 2020/0368616 A1 | 11/2020 | Delamont | | |
| 2021/0067732 A1 | 3/2021 | Someya | | |
| 2022/0203249 A1 * | 6/2022 | Green | | A63G 31/00 |

* cited by examiner

MEDIA PROJECTION WITHIN LIGHT SPHERE DOME

TECHNICAL FIELD

The present disclosure relates generally to media presentation, and more particularly to systems and methods for presenting media content to multiple viewers.

BACKGROUND

Modern media presentation systems provide a variety of ways of presenting video and other associated media content to viewers in useful and entertaining ways. For example, early versions of movie theaters provide moving images or video on a large screen that is visible to many viewers at once. Traditional movie theaters have included a single flat screen along one wall with rows of seats that all face in the same direction toward the screen and various speakers distributed about the theater. Various improvements in movie theaters and systems over time have included the introduction of IMAX® type theaters having very large screens with a tall aspect ratio and steep stadium seating, Dolby® sound systems and theaters, various ways of providing three-dimensional ("3D") viewing effects, and higher resolution video and imagery.

Despite these various improvements over the years, modern movie theaters and other forms of video and other media presentation have involved providing video on a single flat screen with all viewers facing in the same direction toward that screen. 3D viewing effects are then provided by way of special glasses or other devices while still presenting moving images in split, multiple, or different ways on a single flat screen for all viewers. This typical single flat screen mode of presenting movies and other media content has restricted the types of movies and other video and media content that can be presented to viewers and has limited the overall value and experience of such video presentations.

Although traditional ways of presenting media have worked well in the past, improvements are always helpful. In particular, what is desired are media presentation systems and methods that provide a more robust and encompassing visual experience to multiple viewers.

SUMMARY

It is an advantage of the present disclosure to provide media presentation systems and methods that result in a more robust and encompassing visual experience to multiple viewers. The disclosed features, apparatuses, systems, and methods provide improved media presentation solutions that involve surrounding multiple viewers with video imagery above and around all sides of all of the multiple viewers. These advantages can be accomplished in multiple ways, such as by implementing a light sphere dome ("LSD") that includes a display component having a substantially continuous spherical shape, along with other system components configured to provide video imagery onto the LSD.

In various embodiments of the present disclosure, a media presentation system can include a media generation component, a projection component, a first redirection component, and a display component. The media generation component can be configured to generate video imagery. The projection component can be configured to project one or more beams containing the video imagery in an initial direction. The first redirection component can be configured to redirect the one or more beams from the initial direction to a subsequent direction that is different than the initial direction. The display component can be configured to receive the one or more beams and display the video imagery after the one or more beams have been redirected to the subsequent direction. At least a portion of the display component can form a substantially continuous spherical shape (e.g., LSD) configured to surround multiple human viewers of the video imagery above and around all sides of all of the multiple human viewers.

In various detailed embodiments, the system can include a second redirection component configured to receive the one or more beams in the subsequent direction from the first redirection component and redirect the one or more beams in a following direction toward the display component. The first redirection component and the second redirection component can both be spherically shaped mirrors. In various arrangements, the initial direction can be upward, the subsequent direction can be downward, and the following direction can be outward. The second redirection component can be located between the projection component and the first redirection component. Also, the second redirection component can include an opening or a transparent region configured to allow the one or more beams projected from the projection component to pass therethrough and a reflective region configured to reflect the one or more beams redirected from the first redirection component. The system can also include a floor component located beneath the display component, and the floor component can be configured to support the multiple human viewers. A plurality of seats can be distributed about the floor component, and the plurality of seats can be configured in concentric circles relative to a center point of the display component.

In various further detailed embodiments, the system can also include a plurality of speakers distributed about the display component. The plurality of speakers can be configured to provide sounds related to the video imagery to the multiple human viewers. The system can form a dome-shaped movie theater that displays the video imagery at the display component located within the dome. In some arrangements, the system can also include an environment sensing system having a plurality of sensors distributed about the display component, and the environment sensing system can be configured to sense inputs provided by the multiple human viewers. The plurality of sensors can include one or more motion sensors configured to detect motions of the multiple human viewers. Also, the media generation component can be configured to generate video imagery based on the sensed inputs.

In further embodiments of the present disclosure, various methods of presenting media content are provided. Pertinent process steps can include providing a media presentation system, generating video imagery, projecting beam(s) containing the video imagery, redirecting the beam(s), receiving the beam(s) at a display component, and displaying the video imagery at the display component. The provided media presentation system can include a media generation component, a projection component, a first redirection component, and the display component. The video imagery can be generated with the media generation component. One or more beams containing the video imagery can be projected in an initial direction with the projection component. The one or more beams can be redirected from the initial direction to a subsequent direction with the first redirection component, and the subsequent direction can be different than the initial direction. At least a portion of the display component can form a substantially continuous spherical shape configured to surround multiple human viewers of the video imagery above and around all sides of all of the multiple human viewers.

In various detailed embodiments, an additional step can include redirecting the one or more beams from the subsequent direction to a following direction with a second redirection component of the media presentation system. The following direction can be different than the initial direction and the subsequent direction. In some arrangements, the initial direction can be upward, the subsequent direction can be downward, and the following direction can be outward. Further steps can include providing sounds related to the video imagery to the multiple human viewers, sensing one or more inputs from one or more of the multiple human viewers, generating additional visual imagery with the media generation component, wherein the additional visual imagery is based at least in part on the one or more inputs, displaying the additional video imagery at the display component, and/or providing tactile sensations related to the video imagery to the multiple human viewers. The tactile sensations can be provided via a plurality of seats for the multiple human viewers, and the plurality of seats can be configured in concentric circles relative to a center point of the display component.

Other apparatuses, methods, features, and advantages of the disclosure will be or will become apparent to one with skill in the art upon examination of the following figures and detailed description. It is intended that all such additional apparatuses, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed apparatuses, systems and methods for media presentations systems, such as those having LSD components. These drawings in no way limit any changes in form and detail that may be made to the disclosure by one skilled in the art without departing from the spirit and scope of the disclosure.

DETAILED DESCRIPTION

Figure 1:
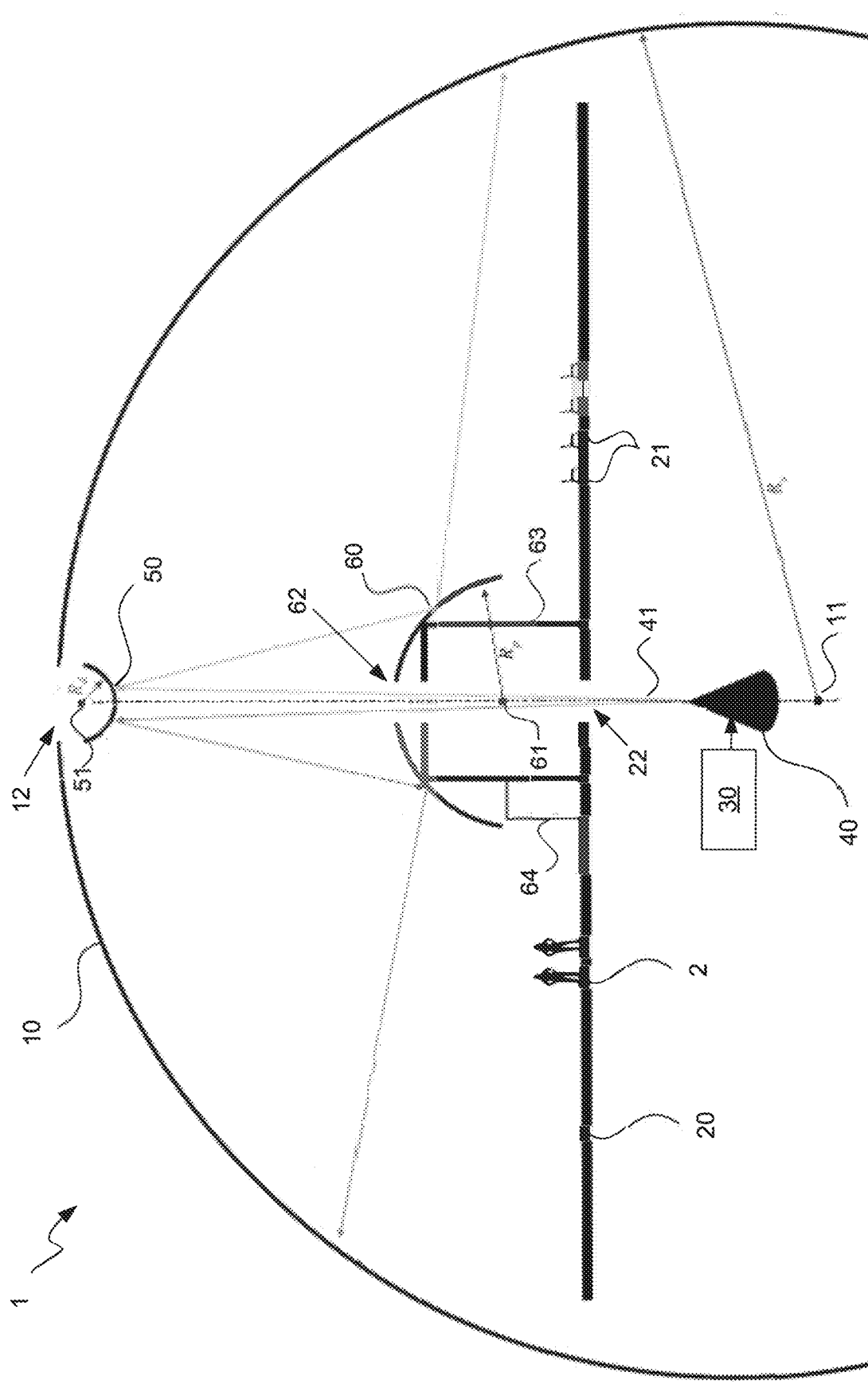
FIG. 1 illustrates in side cross-section schematic view an example LSD for a media presentation system according to one embodiment of the present disclosure.

Exemplary applications of apparatuses, systems, and methods according to the present disclosure are described in this section. These examples are being provided solely to add context and aid in the understanding of the disclosure. It will thus be apparent to one skilled in the art that the present disclosure may be practiced without some or all of these specific details provided herein. In some instances, well known process steps have not been described in detail in order to avoid unnecessarily obscuring the present disclosure. Other applications are possible, such that the following examples should not be taken as limiting. In the following detailed description, references are made to the accompanying drawings, which form a part of the description, and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to features, apparatuses, systems, and methods for presenting media content to multiple viewers. The disclosed embodiments include media presentation systems and methods that provide a more robust and encompassing visual experience to multiple viewers. In particular, an LSD and various associated components and features can be used as part of overall media presentation systems and methods of presenting media content. The disclosed embodiments can utilize this LSD to transport the user into a universe of interactive colors and sound, where all of space and time can meet within the curved spherical walls of a true LSD experience.

In various detailed examples, which are merely illustrative and non-limiting in nature, an LSD can be a spherically shaped room that can be used for theater-style image projection and other related activities. Various subsystems can provide multiple different types of coordinated media content to multiple viewers within the LSD. At least one subsystem can include the use of a suitable projection system to project one or more beams containing video imagery to most or all of the inner surfaces of the spherically shaped room to surround multiple human viewers of the video imagery above and around all sides of all of the multiple human viewers. Other subsystems can involve providing sound, motion sensing and other user inputs, and video image generation, among others. It will be readily appreciated that not every disclosed subsystem is necessary for use with a given media presentation system or method, and that other subsystems not disclosed herein can also or alternatively be used for such systems and methods.

Although various embodiments disclosed herein discuss media presentation systems that utilize an LSD, it will be readily appreciated that the disclosed features, apparatuses, systems, and methods can similarly be used for any relevant media presentations system. While feature length movies are one form of presenting media, for example, other ways of presenting media to multiple users with LSD can include interactive features with the users, such as in the case of large scale interactive video games and other endeavors. Other applications, arrangements, and extrapolations beyond the illustrated embodiments are also contemplated.

Referring first to FIG. 1, an example LSD for a media presentation system is illustrated in side cross-section schematic view. Media presentation system 1 can have multiple human viewers 2 located within LSD 10. While one example size and scale for LSD 10 and overall media presentation system 1 can be reflected in the relative size of multiple human viewers 2 within the system as shown in FIG. 1, it will be readily appreciated that larger or smaller overall systems and LSDs may also be possible. LSD 10 itself can be a continuous spherically shaped room configured to have video imagery and/or other media displayed on or proximate the inner walls of the room. In some arrangements, the actual inner surfaces of LSD 10 can provide a display component for the display of video and other visual image content. In some arrangements, one or more movie screens or other suitable display components can be arranged at or proximate to the inner surfaces of the spherical walls and ceiling of LSD 10.

As shown, LSD 10 (i.e., a "screen dome") can be the largest structure of overall media presentation system 1. This screen dome can be a spherical chamber surrounding an overall theater, on which a movie screen or other suitable display component or components can be attached using support structures that offset the screen component(s) inward from the dome walls. The screen component(s) or other display component(s) can be a theatrical screen shaped as a sphere by the support structure. The spherical shape may be aided using vacuum technology to curve the screen in some arrangements. The overall screen may also be composed of multiple screen segments to aid in constructing the shape. For viewing stereoscopic imagery, the screen may have special reflective materials, as some theatrical screens do, for preserving polarization of the displayed imagery. Other arrangements and features are also possible.

In addition to LSD 10, media presentation system 1 can also include a floor component 20, a media generation component 30, a projection component 40, a first redirection component 50, and a second redirection component 60, among other possible subsystems, components, and features. Floor component 20 can be a theater floor, for example, and can form a supporting room floor for multiple viewers, users, and/or seats 21. Seats 21 can be set into columns, rows, and/or other possible arrangements to face the display component of LSD 10 and can be set along a flat floor and/or arranged as tiered or elevated stadium seating. Floor component 20 can be relatively elevated with respect to a center point 11 of the sphere (having radius $R_s$) formed by LSD 10. Alternatively, floor component 20 can be lowered within LSD 10 to form a greater room space and provide more area for the display component at or on the inner walls of the LSD, as provided in greater detail in the example of FIG. 2 below. Other elevations, locations, and arrangements of floor component 20 are also possible.

Media generation component 30 can be configured to generate video imagery. This component or subsystem can include one or more processors to generate video imagery based on code and/or stored or provided digital images and can also include one or more physical components to generate the video imagery and/or other visual images and to provide that video imagery and/or other visual images to projection component 40, and possibly other system components, such as a transmitter or other communication interface.

Projection component 40 can be configured to project one or more beams 41 containing the video imagery (and/or other visual images) in an initial direction, such as upward, as shown in FIG. 1. In some arrangements, projection component 40 can include one or more scanning laser projection systems and can project the imagery in one or more lasers. In various embodiments, projection component 40 can be located below floor component 20 and can project beam(s) 41 upward through an opening 22 in the floor component, which opening can be located at or near the center of the floor component. Projection component 40 can be oriented such that the center point of the projected beam or beams coincides with the center points of floor component 40 (and opening 22) and first redirection component 50, as well as the top center or peak of LSD 10. In addition, projection component 40 can be mounted on an isolation system to prevent outside vibrations from inducing vibrations in the projected imagery.

In various arrangements, projection component 40 can be similar to current commercial grade theater projectors but may include adjustments to spatial resolution and/or brightness, among other attributes. A minimum scan rate of 120 Hz can be used, such that the projector can completely scan imagery onto the display component of the screen dome at least 120 times every second. The number of pixels to be resolved in each scan can be about 16K×16K (e.g., 15360× 15360 pixels, for a total of 235,929,600 pixels per frame) or higher. Because current commercial grade theater projectors do not operate at such high resolutions, projection component 40 could be a synchronized bundle of multiple projectors, each operating at lower resolution and each responsible for scanning to just a portion of the display component space across LSD 10. Alternatively, projection component 40 can be an advanced customized projector that is developed for such high resolutions and speeds.

While current commercial grade theater projectors are designed to project onto a rectangular flat (or nearly flat) screen, the laser scan pattern for these projectors is typically a progressive row-by-row trace of the area of the rectangle. For the display component of LSD 10 disclosed herein, the spherical geometry of the screen or other display component can differentially distort pixels. This can be at least partially compensated for by altering the laser scanner to a scan pattern that favors more pixels where needed. For example, a spiral scan pattern can favor more pixels toward the equator of the sphere and fewer pixels near the top center. To accomplish this result, new driver software can be developed for the scanning mirror and/or other components inside the projector. Such an altered scan pattern can also be facilitated by a new image format tailored to the scan pattern, as well as a new codec for rapid decompression of the new image format.

A first redirection component 50 can be configured to redirect beam(s) 41 from the initial direction to a subsequent direction that is different than the initial direction. In various arrangements, this first redirection component 50 can be a spherically shaped mirror that is configured to reflect beam(s) 41, such as from an initial upward direction to a subsequent downward direction. First redirection component 50, which can be called a "distribution mirror," for example, can form a convex hemisphere having a center 51 (and radius $R_d$) that can be located at the top center of LSD 10. An opening 12 in LSD 10 or other component or feature at the top center of LSD 10 can be located behind this distribution mirror or other first redirection component 50, since this small area of the LSD does not receive any portion of beam(s) 41 for actual display thereupon. Alternatively, no opening or other feature in LSD 10 behind first redirection component 50 can be used.

A second redirection component 60 can be configured to receive the beam(s) redirected in the subsequent direction from first redirection component 50 and redirect the beam(s) in a following direction toward the display component of LSD 10. In various arrangements, this second redirection component 60 can also be a spherically shaped mirror that is configured to reflect the beams, such as from the subsequent downward direction to the following outward direction. Second redirection component 60, which can be called a "primary mirror," for example, can similarly form a convex hemisphere having a center 61 (and radius $R_p$) that can be located between floor component 20 and first redirection component 50. An opening 62 at the top and center of this primary mirror or second redirection component 60 can allow an initial portion of beam(s) 41 to pass therethrough on an initial beam path upward from projection component 40 to first redirection component 50. Rather than an opening 62, this top and center region of second redirection component 60 can be a half-mirror or can include a clear or translucent material in various alternative arrangements.

In various embodiments, one or both of first redirection component 50 and second redirection component 60 (e.g., distribution and primary mirrors) can be formed of a plated metal material to be as reflective and mirror-like as possible. One or both of redirection components 50 and 60 can be situated using vibration isolation mounts, such that vibrations of the building and other nearby structures and things do not translate into vibrations within the projected video imagery. Protective covers may be used to retract and open in order to protect one or both of redirection components 50 and 60 when these components are not in use.

Primary mirror (or other second redirection component) 60 can be mounted atop support component 63 to elevate the primary mirror above floor component 20. In some arrangements, support component 63 can be telescopic in nature, such that second redirection component 60 can be elevated and lowered with respect to floor component 20. This can allow for fine tuning of the focus and overall length of beam(s) 41 from projection component 40 to the display component of LSD 10. Lowering second redirection component 60 can also allow for easier cleaning and maintenance of this component or subsystem. In some arrangements, one or more structural items 64 can be located at or about support component 63. Such structural item(s) 64 can include concession vending machines, for example, as wells as machinery or equipment housing, doors or other entryways, and/or other structural supports within overall media presentation system 1.

As noted above, LSD 10 can include a display component configured to receive the one or more beams and display the video imagery after the one or more beams have been redirected thereto. As shown, at least a portion of this display component can form a substantially continuous spherical shape configured to surround multiple human viewers of the video imagery above and around all sides of all of the multiple human viewers. Further details regarding the full path of beam(s) originating from projection component 40 and ending at the display component of LSD 10 are provided below with respect to similarly arranged beam(s) in the alternative overall media presentation system 100 of FIG. 2 below. As noted above, use of this overall media presentation system 1 can result in a visual experience that fully surrounds and transports viewers into a universe of interactive colors and sound, where all of space and time can meet within the curved spherical walls of a true LSD experience.

Figure 2:
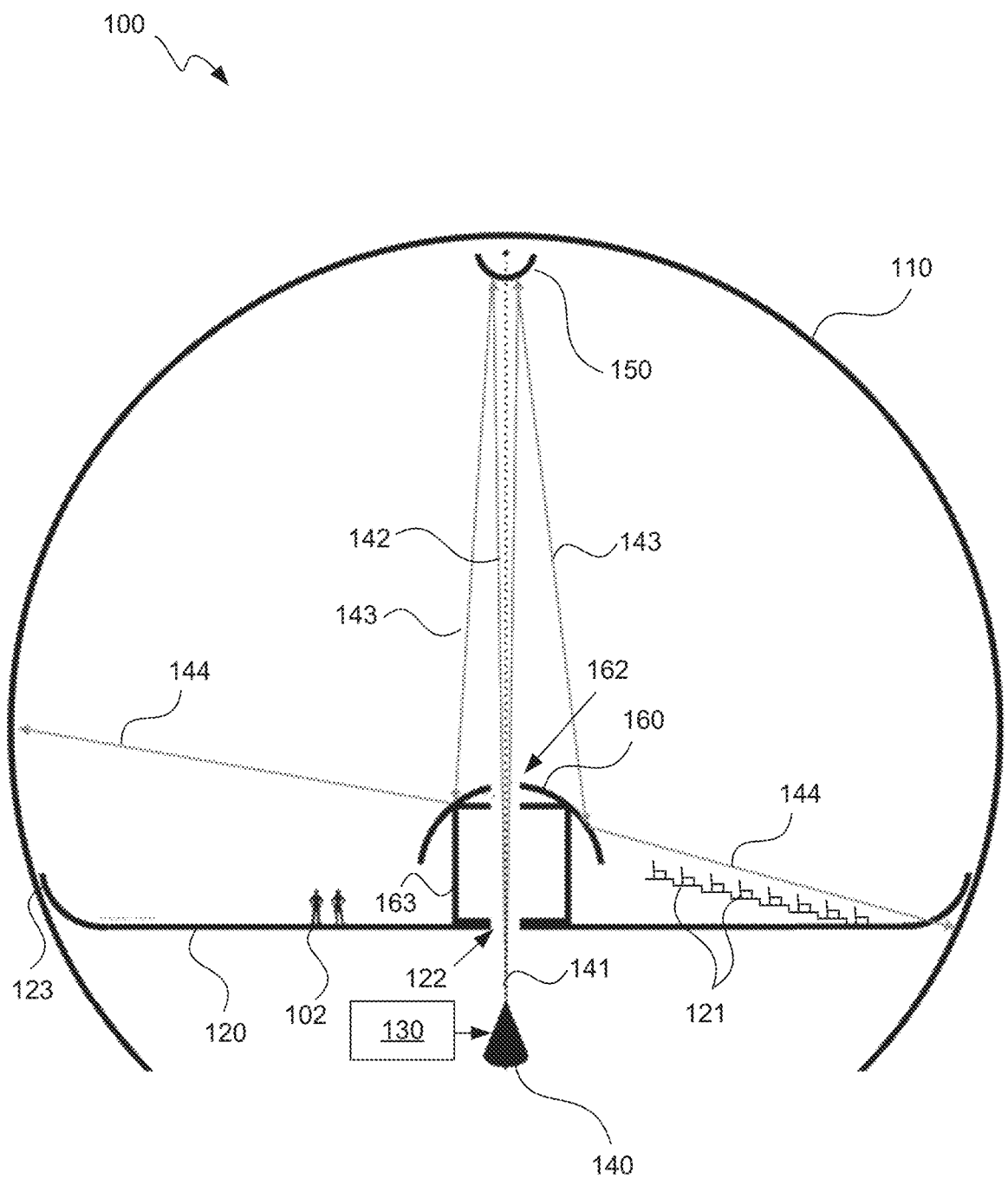
FIG. 2 illustrates in side cross-section schematic view an alternative example LSD for a media presentation system according to one embodiment of the present disclosure.

Continuing with FIG. 2, an example LSD for an alternative media presentation system is also shown in side cross-section schematic view. In various arrangements, media presentation system 100 of FIG. 2 can be significantly similar to media presentation system 1 above, such as having a similar size and scale with respect to multiple human viewers 102 within the system. In addition, media presentation system 100 can include LSD 110, media generation component 130, projection component 140, first redirection component 150, and second redirection component 160 having opening 162 and support component 163, all of which can be identical or substantially similar to similar components in media presentation system 1 above.

Unlike foregoing media presentation system 1, however, floor component 120 of media presentation system 100 can be significantly lowered with respect to LSD 110, resulting in a greater overall space within LSD 110 and a greater amount of display area on the display component of LSD 110. In addition, seats 121 can be arranged in a tiered, stadium style, or other elevated seat arrangement, such that human viewers who are seated farther away from the display component of LSD 110 are able to view more of the display component without being blocked by other viewers. Elevating seats 121 closer to second redirection component 160 also allows for more of the display component of LSD 110 on the opposite side of the second redirection component to be visible to viewers. As will be readily appreciated, the tiered or elevated arrangement of seats 121 can extend all the way around floor component 120 of media presentation system 100, such that little to no portions of the floor component are flat for significant stretches of floor.

In some arrangements, floor component 120 may end in an upward curved region 123 that meets LSD 110. Upward curved region 123 may extend around a continuous full or almost full circumference where it meets with LSD 110, with possible breaks in this circumference existing for doors or other structural features in LSD 110 or elsewhere within media presentation system 100. Upward curved region 123 and some portions of floor component 120 may also be configured for the display of visual or video imagery reflected or otherwise redirected from first redirection component 150 and/or second redirection component 160.

As shown in FIG. 2, one or more beams 141 containing video and/or other visual imagery can be projected upward from projection component 140 through an opening 122 in floor component 120. These beam(s) can be considered in segments from where they initially leave projection component 140 and arrive at the display component of LSD 110. A first beam segment 142 can extend upward in the shape of an expanding cone from projection component 140 to where it is redirected from a distribution mirror or other first redirection component 150. A second beam segment 143 can then extend downward in the shape of a further expanding cone from first redirection component 150 to where it is redirected from a primary mirror or other second redirection component 160. A third beam segment 144 can then extend outward from second redirection component 160 to the display component of LSD 110 (and possibly display component(s) of floor component 120).

As will be readily appreciated, the optical arrangements shown within overall media presentation system 100 allow for a significant amount of distance for one or more beams 141 to travel from projection component 140 to the eventual display component of LSD 110. Such a significant amount of distance can be extended through the use of one or more mirror or other redirection components 150, 160. This arrangement allows for beam(s) 141 containing visual and/or video imagery to originate from projection component 140 or another suitable source in a single compacted direction and then expanded in an outward direction to be received at most or all areas of a large and substantially continuous spherical display component, such as that which can be found along or near the walls of LSD 110. Similar length extension of the beam(s) can be seen with respect to the optics arrangements in media presentation system 1 above as well. While this overall significant length of distance for beam(s) 141 can be accomplished using the arrangement shown that includes redirection components 150, 160, it will be readily appreciated that other optics arrangements can be used to generate and project video imagery to this or a similarly large and substantially continuous spherical display component.

Figure 3:
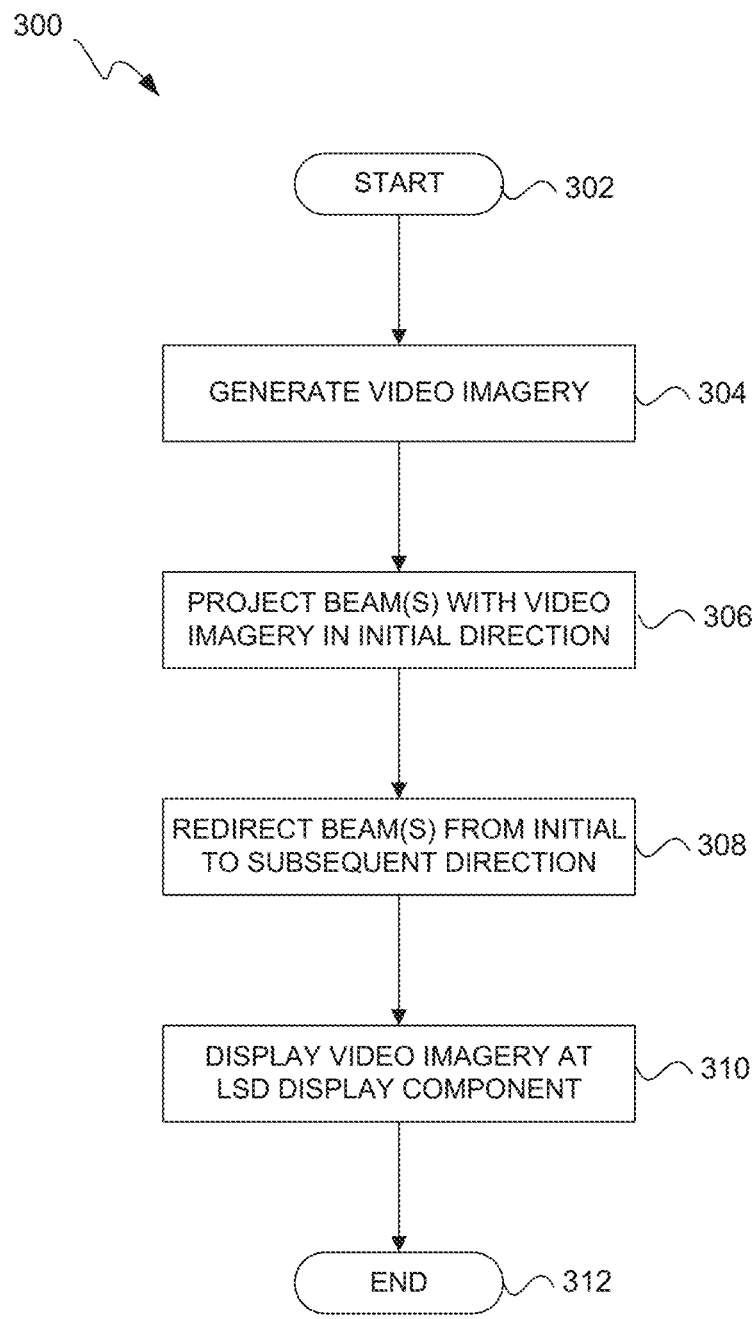
FIG. 3 illustrates a flowchart of an example summary method of presenting media content using LSD according to one embodiments of the present disclosure.

Turning next to FIG. 3, a flowchart of an example summary method 300 of presenting media content using LSD is provided. Summary method 300 can represent a broad overview of presenting media content, and it will be understood that various other steps, features, and details of such a broad overview method are not provided here for purposes of simplicity. After a start step 302, a first process step 304 can involve generating video imagery. This can be done using a media generation component, for example, that can include the use of one or more processors.

As a following process step 306, one or more beams containing the video imagery can be projected in an initial direction. This can be done using a high quality scanning laser projector, for example. At the next process step 308, the one or more beams can be redirected from the initial direction to a subsequent direction. This can be done using a first redirection component, for example, which can be a hemispherical mirror.

At a subsequent process step 310, the video imagery can be displayed at a display component, which can be located on or at an LSD, for example. This can be the result of the redirected beam(s) containing the video imagery arriving at the display component. As noted above, at least a portion of the display component can form a substantially continuous spherical shape configured to surround multiple human viewers of the video imagery above and around all sides of all of the multiple human viewers. The method can then end at end step 312.

For the foregoing summary method 300, it will be appreciated that not all process steps are necessary, and that other process steps and details may be added. Furthermore, the order of steps may be altered in some cases, and some steps may be performed simultaneously. For example, steps 306-310 may be performed simultaneously in some arrangements. Other possible process steps and details are provided in further examples below, and variations and extrapolations of method 300 will also be readily appreciated by those of skill in the art.

Figure 4:
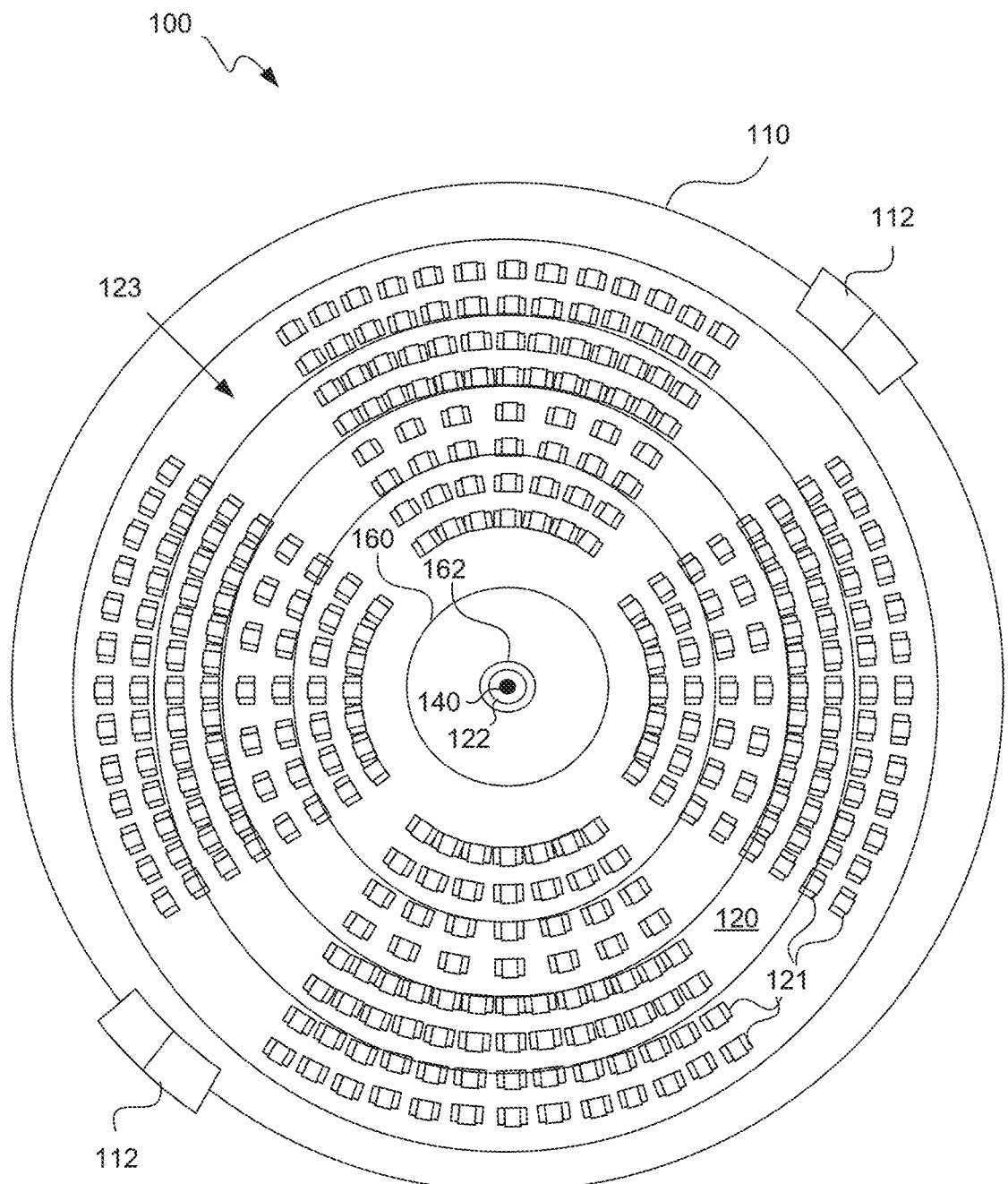
FIG. 4 illustrates in top plan view an example floor arrangement for a media presentation system with an LSD according to one embodiment of the present disclosure.

Transitioning now to FIG. 4, an example floor arrangement for a media presentation system with an LSD is illustrated in top plan view. It will be appreciated that many different seating arrangements and floor patterns can be used for a given media presentation system, and that the followed detailed example can be altered in many ways as desired. As described above with respect to FIG. 2, media presentation system 100 can include a spherically shaped LSD 110 located above and around a floor component 120, a projection component 140 located beneath an opening 122 in the floor component, and a hemisphere shaped second redirection component 160 having an opening 162 located between the floor component and the top of the LSD. One or more doors or sets of doors 112 can be located around the circumference of LSD 110 where the walls of the LSD meet with floor component 112.

Seats 121 can be arranged into rows that form concentric circles around the center of media presentation system 100, which center can coincide with floor opening 122. Some or all of seats 121 can be arranged such that they face the closest inner wall of LSD 110 or the nearest display component thereto. One or more aisles 123 can be located between seats 121 at various locations to facilitate the ingress and egress of human viewers into the rows of seats. As noted above, floor component 120 can form a tiered level theater floor for the system, and seats 121 can be arranged in tiered or stadium style structured rows. Each tier of seats can have one or two rows, before another tier of seats rises behind it, although other arrangements are also possible. The lowest level tier of floor component 120 can be that which is closest to LSD 110, while the highest level tier can be that which is closest to second redirection component 160. In some embodiments, one or more flat regions of floor component 120 may exists, and various sections and tiers of the overall floor component may also be reconfigurable as may be desired. Some or all of seats 121 may be rigidly stationary, while some or all of seats may have some amount of possible motion, such as rotational or lateral motion.

Some or all of seats 121 may be able to rotate or swivel in full circles to allow for greater abilities to view all parts of the LSD display. Tactile effects and user feedback or input may also be possible at one or more seats 121. Various arrangements can also include active, computer-controlled motion seats that may have some amount of user control. Such seats can be similar to those used for theme park rides and immersive virtual reality experiences, for example. These types of seats can supplement a visual sense of motion projected onto the display component of LSD 10 with a physical sense of acceleration coupled to that visual sense. The range of active motion could be as low as simple rumble seats up to very complex systems.

For very active laser tag style games or other interactive video games or presentations where viewers or users can rove around the theater floor to interact with each other and/or with projected imagery and/or other provided media content, there may be no seats in order to use the floor space for game obstacles decorations, and the like. There can also be a mix of seating arrangements in one region of the floor component, and no seats in another region, so as to allow for both seated and roving participants. Modularity and interchangeability of seated and non-seated areas may also be possible in some arrangements.

Figure 5:
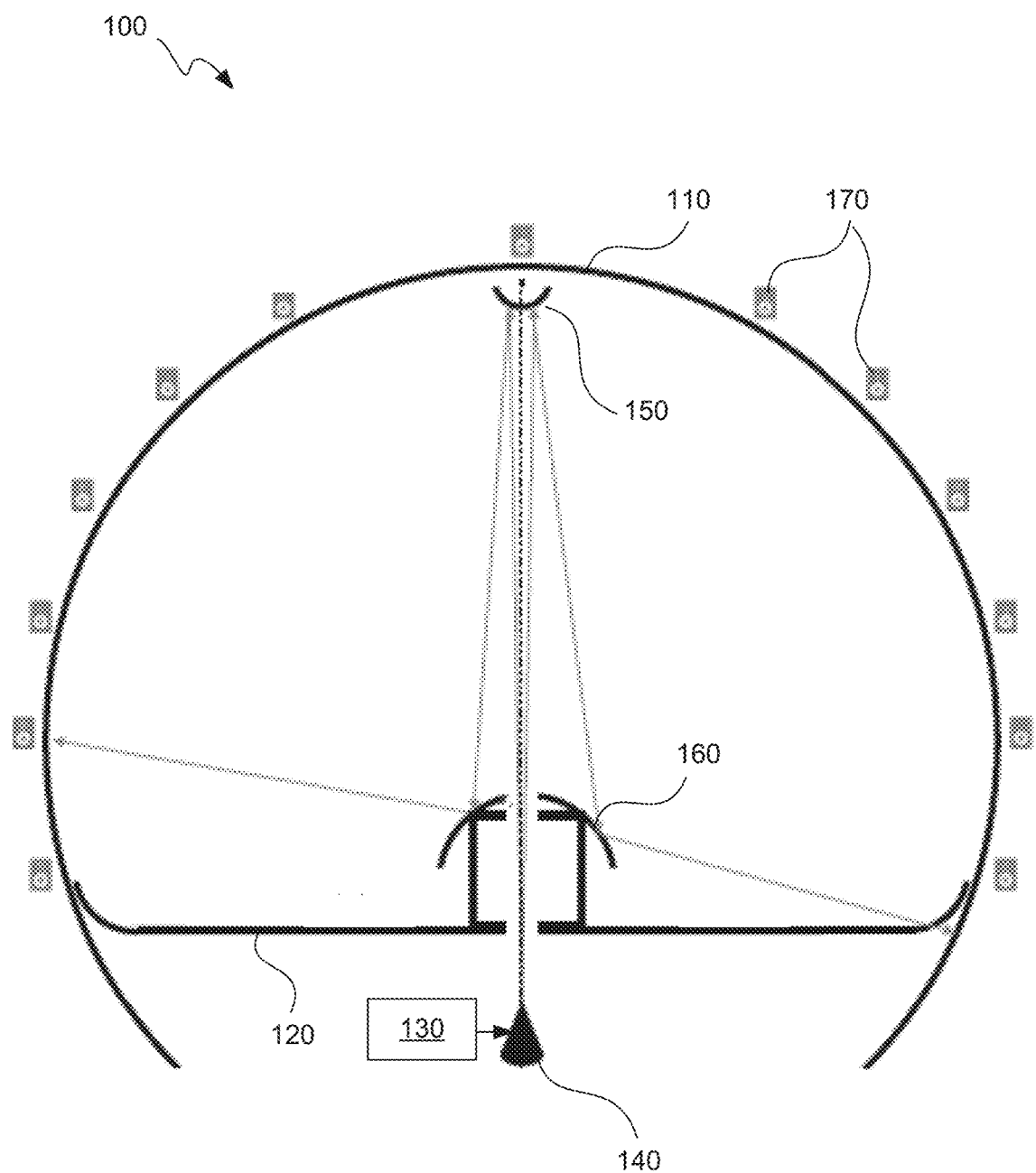
FIG. 5 illustrates in side cross-section schematic view an example media presentation system with an LSD and audio speakers according to one embodiment of the present disclosure.

Moving next to FIG. 5, an example media presentation system with an LSD and audio speakers is shown in side cross-section schematic view. Again, media presentation system 100 can include LSD 110 having an associated display component, floor component 120, media generation component 130, projection component 140, first redirection component 150, and second redirection component 160, among other possible components and subsystems. One or more speakers 170 can also be distributed about media presentation system 100, such as at various locations behind the display component of LSD. Alternatively, or in addition, one or more speakers can also be located beneath or about floor component 120, within or about one or both of redirection components 150, 160, and/or any other suitable locations within the system.

Speakers 170 can be part of an audio subsystem within the overall media presentation system 100. Such an audio subsystem can include one or more processors in communication with other overall system processors, as well as spatial audio hardware, and one or more speakers 170 can be configured into one or more phased arrays. Speakers 170 can both shape the spatial audio to localize sounds and engage in active "noise cancellation" to suppress any undesirable sounds that reflect from the display component and other physical system components that would otherwise cause echoes if not suppressed. Commercial sound design software can aid in such an arrangement, as will be readily appreciated.

Figure 6:
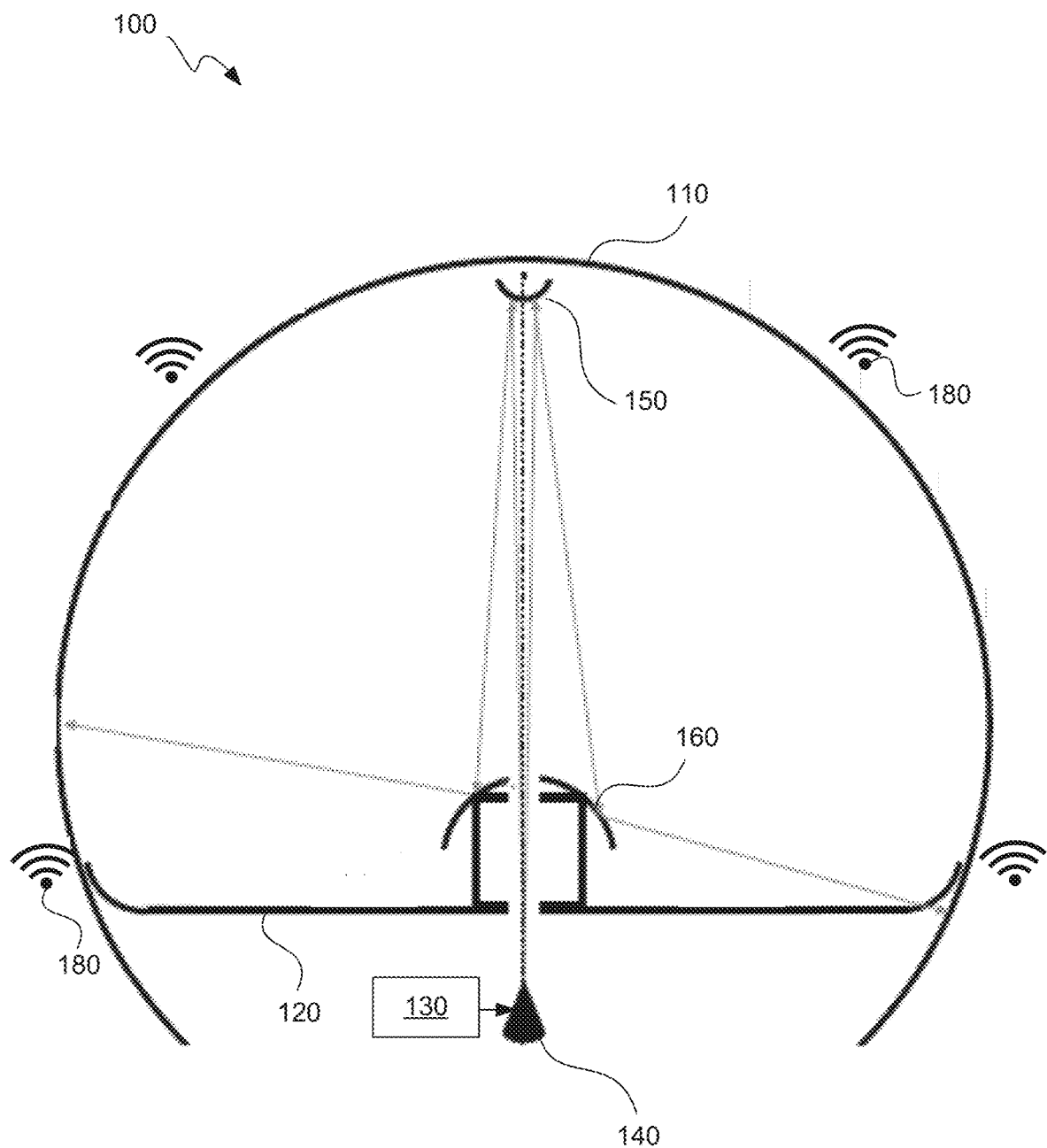
FIG. 6 illustrates in side cross-section schematic view an example media presentation system with an LSD and motion sensors according to one embodiment of the present disclosure.

Continuing with FIG. 6, an example media presentation system with an LSD and motion sensors is similarly depicted in side cross-section schematic view. In addition to the various components illustrated and described in detail above, media presentation system 100 can also include one or more motion capture ("mocap") sensors 180. Such mocap sensors 180 can be configured to capture motion from various human viewers and/or other objects located at floor component 120 and/or elsewhere within LSD 110. Mocap sensors 180 can similarly be located various strategic places behind the display component of LSD 110. Alternatively, or in addition, one or more mocap sensors 180 can also be located beneath or about floor component 120, within or about one or both of redirection components 150, 160, and/or any other suitable locations within the overall system.

Mocap sensors 180 can be part of an overall motion capture, environment sensing and user input subsystem within the overall media presentation system 100. Mocap sensors 180 and other user input and environment sensing hardware and software components can allow human viewers and other users to interact with each other and with the projected imagery and other media content to provide an immersive game and/or role-playing or user input enhanced experience. One example of such a scenario can involve a robust laser tag game. Participants can wear some combination of vest, helmet, gloves, shin guards, "weapons," and the like that can be equipped with electronics for sensing the environment and for tracking the participants and their various actions around the LSD and system. Sensors on the wearables can detect when a participant is "struck by a laser beam," similar to a laser tag approach. Tracking hardware can contain accelerometers to track position and orientation of each wearable element, process the accelerometer data and timestamp, and broadcast it to a Wi-Fi network inside the LSD. Such hardware can include commercially available or custom developed System on a Chip (SoC) devices that are the heart of modern smart phones, for example.

One example of low-cost modern SoC can include the family of Raspberry Pi computers (https://en.wikipedia.org/wiki/Raspberry_Pi#Hardware). Android phones can also contain software called ARCore (https://developers.google.com/ar) that convert accelerometer data into position and orientation. The Wi-Fi network within the overall system can supplement this tracking by using the differential signal strength of a SoC transmission to triangulate the position of the SoC antenna. This integration can utilize custom software developed to exploit or replace these APIs and integrate the unique collection of wearables within the LSD.

In addition to tracking and sensing hardware and software on wearables, sensing hardware can be installed on LSD 110, such as behind the display component and not visible to the LSD occupants, to sense interactions of the occupants with the video imagery and other presented media. Infrared sensors to detect "laser hits" by the occupants, aimed at the screen, can be detected, such that game play can be redirected depending on the script of a given game. One possible scenario might be that an occupant fires a "weapon" at the screen where the video imagery contains a car, the sensors behind the screen detect the event, and the video imagery is altered to project a car exploding along with other altered media content. Other types of games and extrapolations of these specific examples are also contemplated for use with the disclosed LSD and overall media presentation systems disclosed herein.

Other environmental design subsystems and components are also contemplated for use within media presentation system 100. For example, computer-controlled lighting can enhance specific moments of storytelling. Also, fog generators can emit fog through small openings in the floor component, the LSD, and/or other openings within the overall system. Fog machines come in a wide range of sizes and capacities, from the size of a large piece of luggage, to the size of a ball point pen, and customized fog generators can combine with other system components and features to provide a special-purpose display by guiding projected imagery and/or active lights into the fog. Wind machines can enhance the storytelling and couple with the fog, sounds, tactile feedback, and video imagery to produce apparent weather conditions. "Smell-o-vision" technology can also be integrated into the LSD and overall media presentation system in some arrangements.

In various embodiments, stereoscopic projection can be used for providing video and visual imagery within the overall media presentation systems disclosed herein. As will be readily appreciated, stereoscopic projection can give the audience a sense of 3D virtual reality by projecting two images onto the screen and wearing special filter glasses so that the left and right eyes of each human viewer each see only one of the two projected images. By crafting the images to be similar to what each eye would view, apparently 3D objects can be seen. This approach can be imperfect to some degree since each audience member has a different view of the screen from a different location. Since providing different imagery for every individual location is impractical, stereoscopic projection techniques typically provide image pairs based on an ideal viewer at an ideal location, and as such any audience member at a different location suffers some loss of the 3D effect.

In traditional theaters, dual projectors use oppositely polarized light to emit image pairs and audience members wear polarized glasses to filter the images to each eye. The screen must have a special texture to make sure that the reflection of the polarized light from the screen does not mix the polarizations. The image pairs are generated as if each is from a pair of cameras separated by a few inches. For the various LSD structures and associated components disclosed herein, basic stereoscopic structures can be applied with one exception: the extended field of view of the LSD and the associated projection techniques require that the differences between the images in the stereo pair reflect a different choice of ideal location and ideal viewer. The most natural ideal location and viewer can be designated as being located at the geometric center of the theater floor. While this default choice can be made in the mastering of the content imagery to be displayed for purposes of providing stereoscopically projected images, this default choice can be altered statically or dynamically in various situations and presentations depending on the needs of the storytelling for a particular application.

In various places throughout this disclosure, reference has been made to custom software that can be developed for the various subsystems and components of the disclosed media presentations systems. Further details regarding such custom software can include software associated with hardware of the projection component, for example. In some arrangements, a laser scan pattern can be altered from a traditional rectangular progressive scan to one that is more suitable to the spherical shape of an LSD. Custom software can be used to change how a pointing mirror inside each laser scanner is moved to scan out its pattern of pixels. This custom scan pattern can be assisted by a custom image format that efficiently presents pixels to the scanner in a preferred order. When projecting video content, video files can be compressed for efficiency and decompressed at the time of projection. Because the image format is custom to the LSD display and environment, the compression and decompression (codec) algorithms and software will be custom as well.

Referring to game play as another example, GPU-based rendering can be customized from ways that such rendering is traditionally used in the game industry. While customary game engines use a GPU to render assuming normal flat screens, additional customized software can adapt such GPU rendering to the LSD scenario of the disclosed embodiments. One example of such an adaptation can be to direct a GPU to render a scene six times along six primary axes and then stitch the six images into a single LSD-formatted image. This stitching operation can involve the use of LSD-custom software, which can be implemented as a "fragment shader" that executes in the GPU.

As another example, the audio experience in the LSD may benefit from the use of spatial audio technology with a substantial number of speakers hidden behind the screen. The phased array nature of the spatial audio system can both localize sound emissions and suppress echoes from the screen dome, with these functions being accounted for and controlled using custom software in an audio subsystem. As yet another example, mocap and environment sensing can benefit from custom hardware along with custom integration of systems-on-chips into the LSD system, and custom software for tracking and sensing.

Figure 7A:
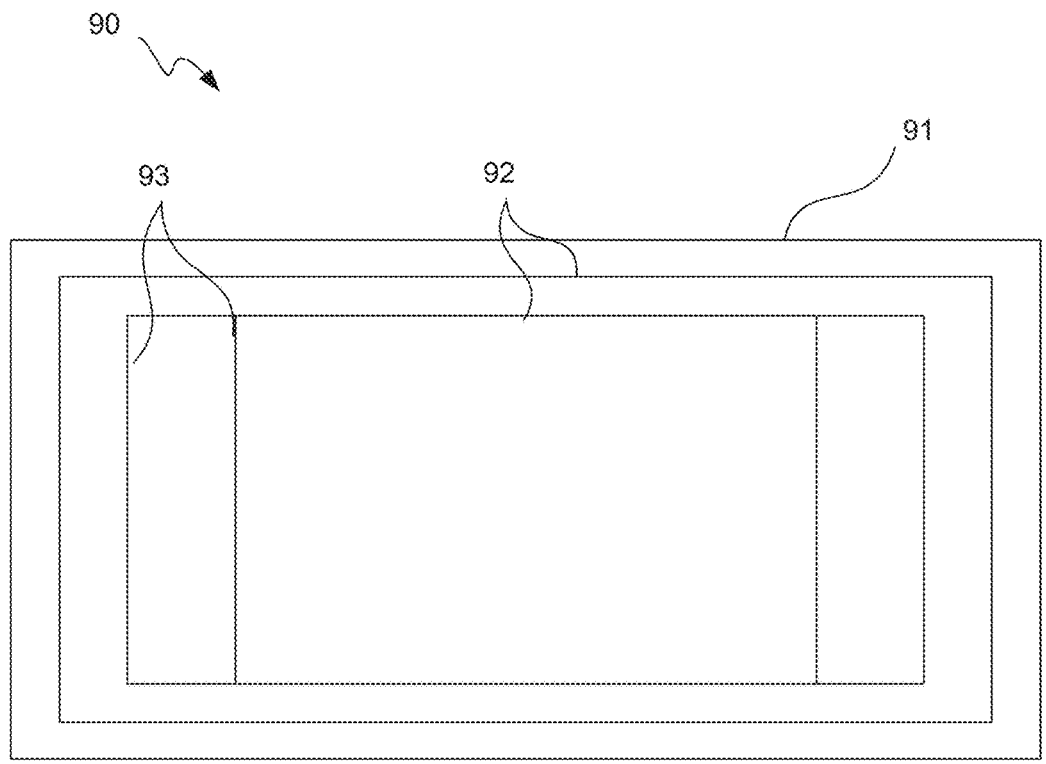
FIG. 7A illustrates in top plan view an example calibration chart for a traditional media presentation system with a flat display screen.

FIG. 7A illustrates in top plan view an example calibration chart for a traditional media presentation system with a flat display screen. As is generally well-known, calibration of a scanning mirror within a standard projector can be accomplished using a calibration chart of landmarks and/or other features. Standard commercial projectors allow an operator to load custom calibration charts built to the special circumstances of individual theaters. Calibration chart 90 is an example of such a chart for projection onto a traditional flat rectangular screen. Calibration chart 90 can include an outer boundary 91 in the shape of a rectangle, one or more horizontal landmarks 92, and one or more vertical landmarks 93, among other possible features, that can be used to calibrate a scanning projector. It will be appreciated that other calibration charts may have many more features or information than this relatively simple example.

Figure 7B:
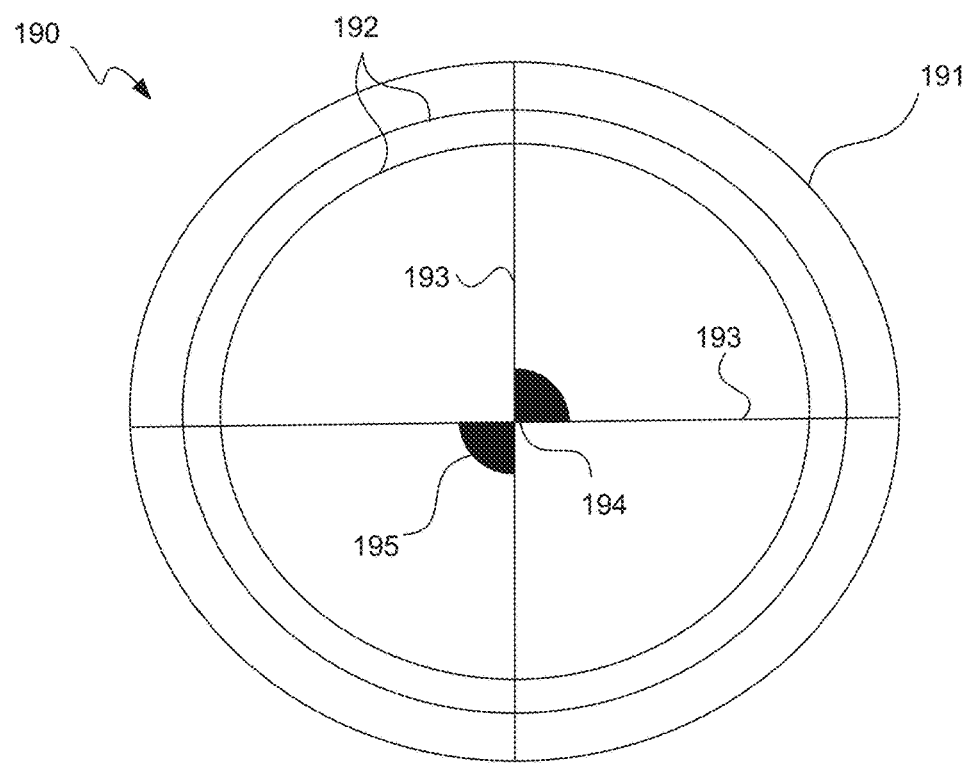
FIG. 7B illustrates in top plan view an example calibration chart for a media presentation system with an LSD according to one embodiment of the present disclosure.

As will be readily appreciated, such standard calibration charts may not translate well to use with media presentation systems with display components that are not flat or substantially flat. FIG. 7B illustrates in top plan view an example calibration chart for a media presentation system with an LSD. Calibration chart 190 can contain patterns relevant to the spherical nature of an LSD display component and can also have discreet landmarks or features that may correspond to discrete target locations on a particular display component of an LSD. For example, calibration chart 190 can include an outer boundary 191 in the shape of a circle, inner concentric circles 192, diametrical landmarks 193, a center point 194, and inner quarter circle landmarks 195 distributed about the center point, among other possible landmarks and features. A calibration using calibration chart 190 can adjust projection component 140 optics, software, and mirror positions and orientations, either manually or automatically, to line up these various chart landmarks with desired locations on the display component of LSD 110.

Figure 8:
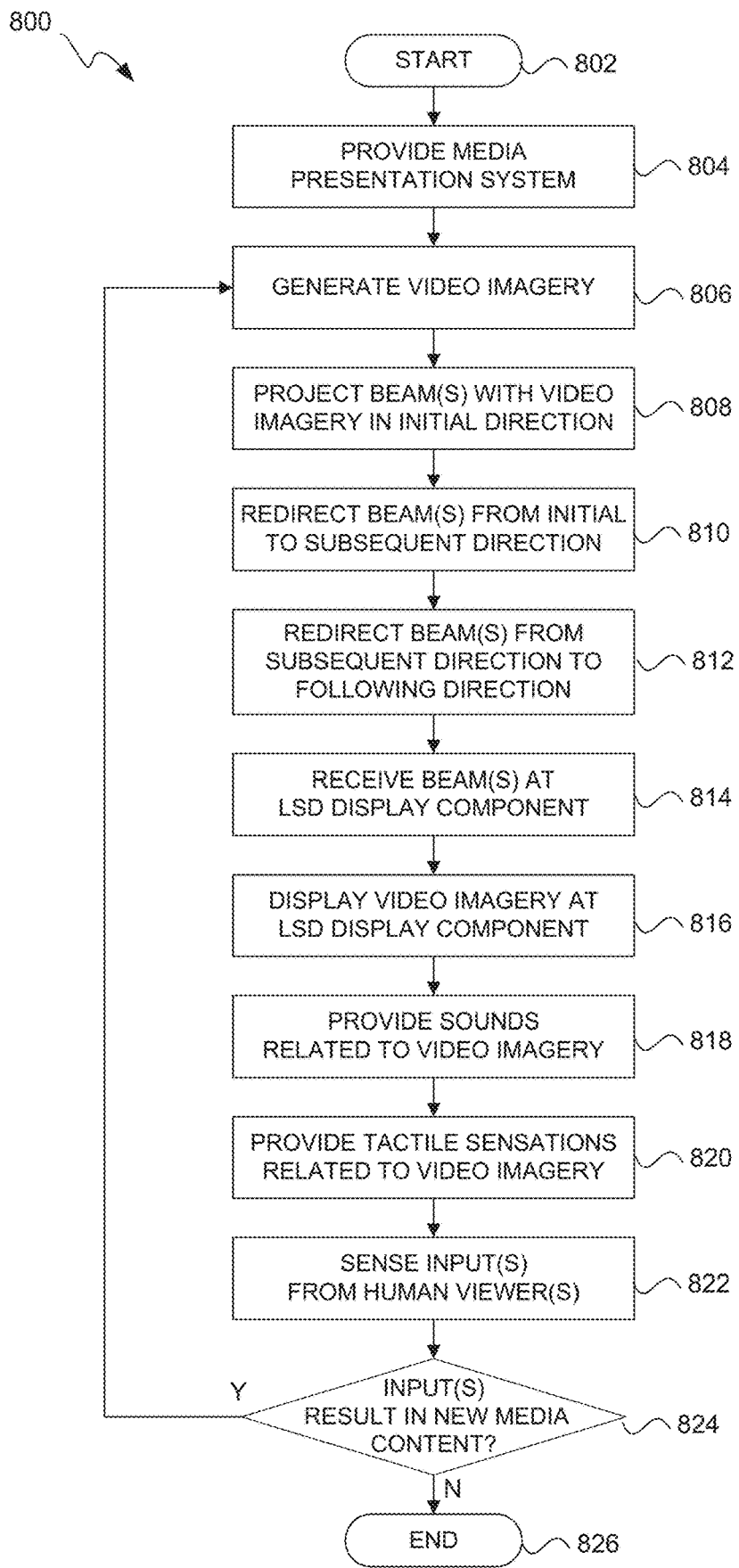
FIG. 8 illustrates a flowchart of an example detailed method of presenting media content using LSD according to one embodiments of the present disclosure.

Turning lastly to FIG. 8, a flowchart of an example detailed method of presenting media content using LSD is provided. Detailed method 800 can represent a more thorough method of presenting media content. After a start step 802, a first process step 804 can involve providing a media presentation system. Such a media presentation system can include a media generation component, a projection component, one or more redirection components, and a display component, among other possible components and/or subsystems, such as that which is described above for system 1 or system 100. Other similar types of media presentation systems having an LSD or similar spherically shaped display component may also be used.

At a following process step 806, video imagery can be generated. This can be done using a media generation component, which can involve the use of one or more processors, such as that which is described in detail above. At subsequent process step 808, one or more beams containing the video imagery can be projected in an initial direction. This can be done using a projection component, such as that which is described in detail above. The initial direction can be upward, such as where the projection component is located directly below a central opening in a floor component of the media presentation system. Other locations are also possible.

At the next process step 810, the one or more beams can be redirected from the initial direction to a subsequent direction. This can be accomplished using a distribution mirror or other first redirection component, which can be located at the top center of an LSD of the media presentation system. The subsequent direction can be different than the initial direction. For example, the subsequent direction can be downward where the initial direction is upward.

At a following process step 812, the one or more beams can be redirected again, this time from the subsequent direction to a following direction. This can be done using a primary mirror or other second redirection component, which can be located between the first redirection component and a floor component of the media presentation system. The following direction can be different than both the subsequent and initial directions, and can be outward, for example.

At subsequent process step 814, the one or more beams can be received at a display component within the media presentation system, and at process step 816 the video imagery can be displayed at the display component. As detailed above, such a display component can be part of or proximate an LSD, and at least a portion of the display component can form a substantially continuous spherical shape configured to surround multiple human viewers of the video imagery above and around all sides of all of the multiple human viewers.

At a following process step 818, sounds related to the video imagery can be provided to the multiple human viewers. This can be done by using one or more speakers distributed about the media presentation system, such as at various locations behind the spherically shaped display component. Other locations for speakers within the media presentation system can also be used either alternatively or in addition to the various locations behind the display component. The provided sounds can be coordinated with the displayed video imagery, such as through the use of one or more processors.

At subsequent process step 820, tactile sensations related to the video imagery can be provided to the multiple human viewers. Such tactile sensations are provided in any number of ways, such as via a plurality of seats for the human viewers. In some arrangements, the plurality of seats can be configured in concentric circles relative to a center point of the display component, such as in an elevated or stadium style arrangement.

At the next process step 822, one or more inputs can be sensed from one or more of the human viewers or users. Such inputs can be, for example, various motions from the viewers or users, which motions can be sensed by one or more mocap sensors distributed at various locations about the media presentation system. Other types of inputs can include button inputs or inputs accepted from other user items, such as video game controllers, for example. In some embodiments, these user input(s) might result in a need for generating additional visual imagery and/or other media (e.g., sounds, tactile) with the media generation component, and the additional visual imagery and/or media can be based at least in part on the one or more inputs. The additional video imagery can then be displayed at the display component and/or other newly generated media can be presented by speakers or other items as may be appropriate.

At decision step 824, an inquiry can be made as to whether the sensed input(s) result in a need for new media content. This need can arise, for example, in the case of video games or other user interactive experiences within the LSD. In the event that new media content needs to be generated as a result of the input or inputs from the human viewers or users, then the method can revert to process step 806 and steps 806-824 can be repeated. If no new media content is needed, however, then the method can end at end step 826.

For the foregoing detailed method 800, it will be appreciated that not all process steps are necessary, and that other process steps and details may be added. Furthermore, the order of steps may be altered in some cases, and some steps may be performed simultaneously. For example, steps 818 and 820 may be reversed, and step 822 may be performed at other stages in the overall process. As another example, steps 806-820 may all be performed simultaneously in some arrangements. Other possible process steps, details, variations, and extrapolations of detailed method 800 will also be readily appreciated by those of skill in the art.

As will be readily appreciated, media presentation systems like those disclosed herein having display components involving an LSD provide extreme changes in the nature and qualities of video imagery projection and perception. Video imagery capture, generation, features, and game content that exploit these changes can be developed specifically for the disclosed LSD environment. Completely computer graphic generated content can be one straightforward approach to content creation for such a new system. Live action videography can also be highly desirable, and such advanced camera systems can involve newly designed cameras as well as current camera technologies involving arrangements of multiple cameras to result in full-sphere or hemispherical imaging. For all forms of content, use of an existing software-based mastering system can properly distort images to account for spherical projection issues and complexities, as well as to write these images to a custom "LSD image format."

There are numerous different ways in which the disclosed LSD and associated subsystems and components can be applied and used by the general public or by specific groups. In the various use cases set forth below, it will be understood that references to LSD can include the unique aspects of a continuous spherically shaped display component as well as any suitable combination of the various subsystems, components, and features of an overall media presentation system as set forth herein. While the following use cases have been identified, it will be readily appreciated that many other use cases and applications of LSD beyond these particular examples may exist.

Modified Cinematic Theater—As noted above, a traditional cinematic experience can involve a user or human viewers watching a feature film on LSD, with possible modifications that the spherical extent of the screen affords new visual and storytelling experiences.

Modified Ride Entertainment—New and innovative ride systems, such as for use in amusement parks, can project imagery onto sections of a sphere to fill audience fields of vision and can use motion seats to give the impression of moving through a scene even though the audience is effectively stationary. The LSD could use motion seats with a unique field of vision coverage across some or all parts of one or more LSDs to enhance the ride experience.

Super Laser Tag—The LSD floor can serve as a play space in which players roam and interact with each other. Through new applications of motion capture technology and the LSD spherical display surrounding all players above and to all sides, roving players can interact with each other and the LSD visual environment to enhance a laser tag gaming experience.

"Holodeck" Scenery Renditions—Very high quality and high-definition projection in the LSD can give viewers the impression of immersion into the projected scenery.

Video Game Play with Motion Seats—Enhanced video games can exploit the expanded field of vision of the LSD while video game players sit in motion seats for various different types of enhanced interactive gaming experiences.

Video Game Play with Roving Players—Video game players can rove around the theater floor interacting with other players and the physical environment of the theater. Subsystems that integrate motion capture technology and/or other forms of player inputs can allow for player interactions within a virtual environment projected on the LSD.

Video Game Play with Remote Multiple LSDs—Many forms of video games allow interactive game play with other gamers remotely, and possibly around the globe, via online gaming communications. This approach can be applied using multiple LSDs, allowing players at one LSD to interact and play with other players at one or more other LSDs located remotely.

Training System for Public or Private Entities—High visual qualities, surrounding theater experiences, and/or interactivity possibilities in the disclosed LSDs and associated subsystems and components can allow training exercises to take place. Such training exercises can be customized and modified to be suitable for industrial, commercial, military and/or governmental agency training, for example.

Scientific Visualization—The high quality visual display and interactivity capabilities of an LSD and associated components can provide a suitable platform to connect to scientific visualization applications. Such applications can be similar to how the Allosphere at UCSB (https://allosphere.ucsb.edu/about/) is used, but with enhanced quality and scale compared to the more limited applications and uses of the Allosphere.

Museum and Planetarium Presentations—The disclosed LSD and subsystems and components can provide a natural extension and extrapolation to the various values and styles of presentations in traditional museums and planetariums in use today.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. A media presentation system, the system comprising:
   a media generation component configured to generate video imagery;
   a projection component configured to project one or more beams containing the video imagery in an initial direction, the projection component including a stereoscopic projection component configured to project multiple beams containing multiple images such that three-dimensional imagery is perceived by multiple human viewers, wherein the projection component is configured to project a spiral scan pattern that is customized for a spherical shape of a display component that favors more pixels toward an equator of the display component and fewer pixels toward a top of the display component, and wherein the projection component includes an internal pointing mirror configured to be moved while the projection component scans out the spiral scan pattern of pixels;
   a first redirection component configured to redirect the one or more beams from the initial direction to a subsequent direction that is different than the initial direction;
   the display component configured to receive the one or more beams and display the video imagery after the one or more beams have been redirected to the subsequent direction, wherein at least a portion of the display component forms a substantially continuous spherical shape configured to surround multiple human viewers of the video imagery above and around all sides of all of the multiple human viewers;
   a floor component located beneath the display component, wherein the floor component is configured to support the multiple human viewers; and
   a plurality of seats distributed about the floor component, wherein the plurality of seats are configured in concentric circles relative to a center point of the display component.

2. The system of claim 1, further comprising:
   a second redirection component configured to receive the one or more beams in the subsequent direction from the first redirection component and redirect the one or more beams in a following direction toward the display component.

3. The system of claim 2, wherein the first redirection component and the second redirection component are both spherically shaped mirrors.

4. The system of claim 3, wherein the initial direction is upward, the subsequent direction is downward, and the following direction is outward, wherein the second redirection component is located between the projection component and the first redirection component, and wherein the second redirection component includes an opening or transparent region configured to allow the one or more beams projected from the projection component to pass therethrough and a reflective region configured to reflect the one or more beams redirected from the first redirection component.

5. The system of claim 1, further comprising:
   a plurality of speakers distributed about the display component, wherein the plurality of speakers are configured to provide sounds related to the video imagery to the multiple human viewers.

6. The system of claim 1, wherein the system forms a dome-shaped movie theater that displays the video imagery at the display component located within the dome.

7. The system of claim 1, further comprising:
   a environment sensing system having a plurality of sensors distributed about the display component, wherein the environment sensing system is configured to sense inputs provided by the multiple human viewers.

8. The system of claim 7, wherein the plurality of sensors includes one or more motion sensors configured to detect motions of the multiple human viewers, and wherein the media generation component is configured to generate video imagery based on the sensed inputs.

9. The system of claim 1, wherein the projection component is located below the floor component and is configured to project the video imagery through an opening in the floor component.

10. The system of claim 1, wherein the projection component is mounted on an isolation system to prevent outside vibrations from inducing vibrations in the projected imagery.

11. The system of claim 1, wherein the projection component includes a synchronized bundle of multiple projectors.

12. The system of claim 1, wherein the display component includes reflective materials configured to preserve polarization of the displayed imagery.

13. The system of claim 1, wherein the plurality of seats rotate or swivel.

14. The system of claim 1, wherein the projection component is configured to resolve about 235 million or more pixels per frame.

15. The system of claim 1, wherein the stereoscopic projection component is configured to provide stereoscopic imagery based on a specific viewing location that can be altered statically or dynamically.

16. The system of claim 1, further comprising:
   one or more fog generators configured to emit fog into the path of the one or more beams, wherein the emitted fog provides an additional special-purpose display.

17. A method of presenting media content, the method comprising:
   providing a media presentation system including a media generation component, a projection component, a first redirection component, and a display component;
   generating video imagery with the media generation component;
   projecting multiple beams containing the video imagery in an initial direction with the projection component, the projection component including a stereoscopic projection component configured to project the multiple beams containing multiple images such that three-dimensional imagery is perceived by multiple human viewers, wherein the projecting involves projecting a spiral scan pattern that is customized for a spherical shape of a display component that favors more pixels toward an equator of the display component and fewer pixels toward a top of the display component, and wherein the projection component includes an internal pointing mirror configured to be moved while the projection component scans out the spiral scan pattern of pixels;

redirecting the one or more beams from the initial direction to a subsequent direction with the first redirection component, wherein the subsequent direction is different than the initial direction;

receiving the one or more beams at the display component; and displaying the video imagery at the display component, wherein at least a portion of the display component forms a substantially continuous spherical shape configured to surround multiple human viewers of the video imagery above and around all sides of all of the multiple human viewers; and providing tactile sensations related to the video imagery to the multiple human viewers, wherein the tactile sensations are provided via a plurality of seats for the multiple human viewers, and wherein the plurality of seats are configured in concentric circles relative to a center point of the display component.

18. The method of claim 17, further comprising:
directing the one or more beams from the subsequent direction to a following direction with a second redirection component of the media presentation system, wherein the initial direction is upward, the subsequent direction is downward, and the following direction is outward.

19. The method of claim 17, further comprising:
providing sounds related to the video imagery to the multiple human viewers.

20. The method of claim 17, further comprising:
sensing one or more inputs from one or more of the multiple human viewers;

generating additional visual imagery with the media generation component, wherein the additional visual imagery is based at least in part on the one or more inputs; and displaying the additional video imagery at the display component.

* * * * *